US012228588B2

(12) United States Patent
Weiss et al.

(10) Patent No.: US 12,228,588 B2
(45) Date of Patent: Feb. 18, 2025

(54) SYSTEM AND METHOD FOR VIBRATION SEVERITY MEASUREMENT

(71) Applicant: Cornell Pump Company, Clackamas, OR (US)

(72) Inventors: Aaron Arthur Weiss, Portland, OR (US); Jonathan Cedarleaf, Portland, OR (US)

(73) Assignee: CORNELL PUMP COMPANY LLC, Clackamas, OR (US)

( * ) Notice: Subject to any disclaimer, the term of this patent is extended or adjusted under 35 U.S.C. 154(b) by 8 days.

(21) Appl. No.: 17/673,152

(22) Filed: Feb. 16, 2022

(65) Prior Publication Data

US 2022/0268807 A1 Aug. 25, 2022

Related U.S. Application Data

(60) Provisional application No. 63/151,307, filed on Feb. 19, 2021.

(51) Int. Cl.
*G01P 15/097* (2006.01)
*G01H 1/00* (2006.01)
(Continued)

(52) U.S. Cl.
CPC ............ *G01P 15/097* (2013.01); *G01H 1/003* (2013.01); *G01H 1/06* (2013.01); *G01H 1/16* (2013.01);
(Continued)

(58) Field of Classification Search
CPC ........ G01H 1/16; G01P 15/18; G05B 23/0221
See application file for complete search history.

(56) References Cited

U.S. PATENT DOCUMENTS 5,506,791 A 4/1996 Hungerford et al.
6,330,525 B1 12/2001 Hays et al.
(Continued)

FOREIGN PATENT DOCUMENTS

CN 111122186 A * 5/2020
WO WO-2020069579 A1 * 4/2020 ........... G05B 19/042

OTHER PUBLICATIONS

Machine translation of CN111122186A (Year: 2020).*
(Continued)

*Primary Examiner* — Lee E Rodak
*Assistant Examiner* — Sangkyung Lee
(74) *Attorney, Agent, or Firm* — Snyder, Clark, Lesch & Chung, LLP

(57) ABSTRACT

A device, system, and method are provided for providing vibration data for rotating machinery. A sensor device is provided as a one-piece unit that is mechanically mounted to a pump. The sensor includes a vibration sensor, a processor, a wireless communications interface for exchanging data with a user device, and an internal battery. The processor is configured to receive a measurement request from the user device via the wireless communications interface. In response, the processor is further configured to configure the vibration sensor, receive data samples for multiple axes from the vibration sensor, and calculate a component velocity root mean square (vRMS) value, from the data samples, for each of the multiple axes. The processor may combine the component vRMS values into a sample vRMS value, and send a final vRMS value, based on the sample vRMS value, to the user device via the wireless communication interface.

20 Claims, 6 Drawing Sheets

(51) Int. Cl.
*G01H 1/06* (2006.01)
*G01H 1/16* (2006.01)
*G01P 15/18* (2013.01)
*G05B 23/02* (2006.01)

(52) U.S. Cl.
CPC .......... *G01P 15/18* (2013.01); *G05B 23/0221* (2013.01)

(56) References Cited

U.S. PATENT DOCUMENTS

| | | | |
|---|---|---|---|
| 10,113,941 B2 | 10/2018 | Kostyukov et al. | |
| 10,132,723 B2 | 11/2018 | Kostyukov et al. | |
| 10,746,642 B2 | 8/2020 | Sun et al. | |
| 11,280,667 B2* | 3/2022 | Hauptmann | G01H 1/10 |
| 2003/0006915 A1 | 1/2003 | Kauppila et al. | |
| 2005/0017602 A1 | 1/2005 | Arms et al. | |
| 2009/0290168 A1* | 11/2009 | Hamamatsu | G01N 21/9501 |
| | | | 356/600 |
| 2013/0166077 A1* | 6/2013 | Elliott | G05D 19/02 |
| | | | 700/280 |
| 2017/0202608 A1* | 7/2017 | Shelton, IV | H01M 6/5044 |
| 2018/0149516 A1 | 5/2018 | Wascat et al. | |
| 2018/0180516 A1 | 6/2018 | Kostyukov et al. | |
| 2018/0181086 A1 | 6/2018 | Kostyukov et al. | |
| 2018/0199145 A1* | 7/2018 | Franck | H04S 3/004 |
| 2018/0202890 A1 | 7/2018 | Mutch et al. | |
| 2018/0216990 A1* | 8/2018 | Rothwell | G01H 1/00 |
| 2019/0064034 A1 | 2/2019 | Fayfield et al. | |
| 2019/0317055 A1* | 10/2019 | Albers | G01N 29/50 |
| 2020/0117182 A1* | 4/2020 | Cella | G06Q 10/04 |
| 2021/0176318 A1* | 6/2021 | Darrah | G01D 21/02 |
| 2021/0356352 A1* | 11/2021 | Ueno | G01M 7/025 |

OTHER PUBLICATIONS

Michael Mullen, "Data Acquisition, Analysis, and Modeling of Rotordynamic System," dissertation, Jun. 2020 (Year: 2020).*

"i-Alert" accessed Feb. 16, 2022, <https://www.i-alert.com/>.

"ERBESSD Instruments" accessed Feb. 16, 2022, <https://www.erbessd-instruments.com/>.

Koene Ivar et al., "Internet of Things Based Monitoring of Large Rotor Vibration With a Microelectroechanical Systems Accelerometer," IEEE Access, vol. 7, Jul. 10, 2019, pp. 92210-92219.

International Search Report and Written Opinion issued in corresponding International Application No. PCT/US2022/016558, mailed on May 17, 2022, 15 pages.

* cited by examiner

SYSTEM AND METHOD FOR VIBRATION SEVERITY MEASUREMENT

CROSS-REFERENCE TO RELATED APPLICATION

This application claims priority under 35 U.S.C. § 119, based on U.S. Provisional Patent Application No. 63/151,307 filed Feb. 19, 2021, titled "System and Method for Vibration Severity Measurement," the disclosure of which is hereby incorporated by reference.

BACKGROUND OF THE INVENTION

A standard unit for quantifying the vibration severity on a piece of rotating equipment is velocity root mean square (RMS). To measure the velocity RMS of a vibration signal, an accelerometer or other sensor can be used in contact with the machine under test to generate raw sensor data. A processor may perform the numerical calculations from the raw sensor data.

DETAILED DESCRIPTION OF THE PREFERRED EMBODIMENTS

The following detailed description refers to the accompanying drawings. The same reference numbers in different drawings may identify the same or similar elements. Also, the following detailed description does not limit the invention.

Systems and methods described herein provide a sensor system that gives users the ability to obtain a snapshot of rotating machinery data, and particularly vibration data, remotely. A sensor device is provided as a single unit that mechanically attaches to an outside surface of a piece of rotating machinery (such as a pump) and detects vibration. The sensor device uses a low-cost accelerometer to generate raw sensor data and a processor to compute velocity root mean square (RMS), as a measure of vibration severity. According to an implementation, the sensor device obtains accelerometer data and performs unique measurement calculations locally on a low-cost multi-purpose processor. The measurement calculations minimize processor cycles and power requirements to provide RMS vibration measurements. The RMS vibration measurements can be wirelessly provided to a paired user device for presentation to a user.

The systems and methods described herein allow for a low cost alternative to generating standardized measurements and making the measurements available to the cloud. The sensor device may be equipped with a battery that provides up to a five-year battery life under intended usage. In one implementation, the sensor device may include a display to present a vibration measurement to a user. Additionally, or alternatively, the sensor device may use a wireless personal area network (WPAN) communication interface to transmit the data to a client application on a user device. The client application interacts with the sensor device to activate a measurement process and obtain/present a RMS vibration reading. According to another implementation, the client application may provide a data log to a cloud-based application server.

In contrast, conventional vibration sensors that can provide RMS measurements tend to be expensive, complex, and/or require significant compute resources to perform the calculations. As more compute resources are used, more power is needed for these sensors/processors, and the device becomes physically larger. In addition, many vibration sensors use a hardware-based solution rather than a compute-based solution to calculate velocity RMS. For example, a velocimeter (an integrated circuit) and RMS-to-DC converter (another integrated circuit) can be used instead of computing velocity RMS on a processor from raw accelerometer data, however at the expense of higher part cost. Furthermore, some existing vibration sensors require a proprietary gateway or wireless communication type. The requirements do not lend themselves to being met on small, inexpensive, battery-powered embedded pieces of hardware.

Figure 1:
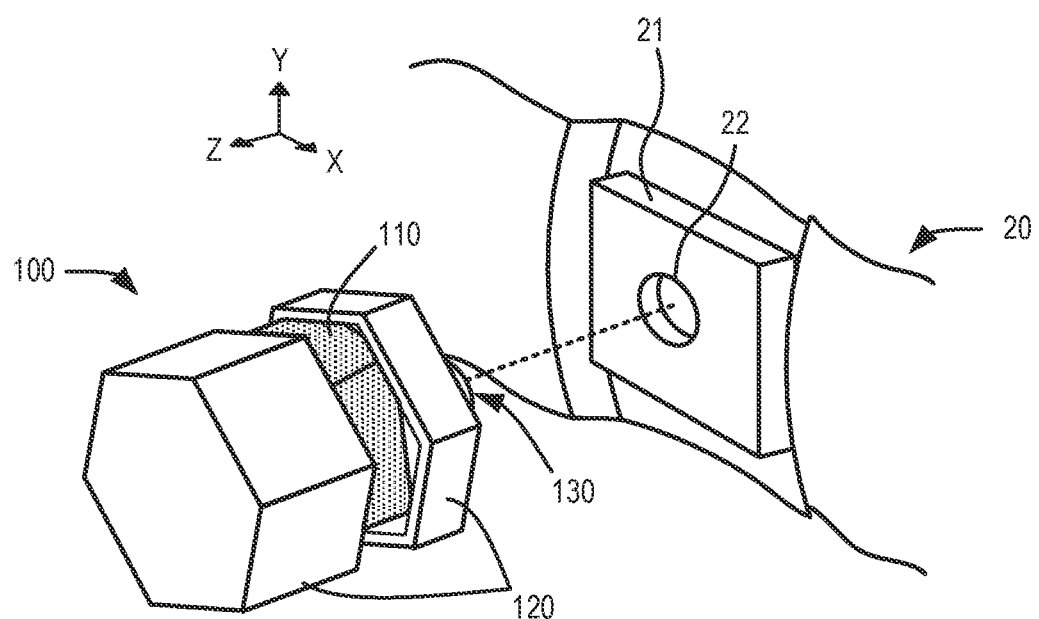
FIG. 1 is an installation assembly view of a sensor device according to an implementation described herein and a portion of rotating machinery.

FIG. 1 is a schematic assembly view of sensor device 100, according to an implementation described herein. Generally, sensor device 100 may be configured for attachment to a portion of rotating machinery 20. Sensor device 100 may include an electronics assembly 110, an enclosure 120, and an attachment piece 130.

Electronics assembly 110 may detect and report vibration data associated with rotating machinery 20 to which sensor device 100 is attached. Electronics assembly 110 may include, for example, a printed circuit board (PCB) to which a battery and powered components described herein may be connected. Features of electronics assembly 110 are described further in connection with FIGS. 2-4, for example. Preferably, electronics assembly 110 and any other internal components for sensor device 100 may be relatively small to minimize the required size of enclosure 120.

Enclosure 120 may include a single piece or multiple sections joined together to form an enclosed cavity therein. Electronics assembly 110 may be secured within the cavity of enclosure 120. In one implementation, enclosure 120 provides a sealed casing against dust or spray (e.g., sufficient for an IP65 ingress protection rating). In another implementation, enclosure 120 may provide protection against high pressure spray (e.g., sufficient for an IP66 ingress protection rating). In one implementation, enclosure 120 may have a width/diameter (i.e., in a plane of the x-axis and y-axis of FIG. 1) of a standard bolt size. For example, enclosure 120 may have normal hexagonal dimension across the flats of the hexagon of 35.0 mm and a height of 28.6 mm.

Attachment piece 130 may include a device for rigidly attaching enclosure 120 to rotating machinery 20. For example, as shown in FIG. 1, rotating machinery 20, such as a pump or another type of rotating equipment, may include a mounting surface 21 onto which sensor device 100 may be attached. According to one implementation, mounting surface 21 may be a flat machined surface with a tapped mounting hole 22, for example. In one implementation, mounting surface 21 may be incorporated with or located on a bearing housing of rotating machinery 20. In other implementations, rotating machinery 20 may include a mounting hole without a flat mounting surface 21. In still other implementation, rotating machinery 20 may not include either dedicated mounting surface 21 or mounting hole 22. For example, in some implementations, sensor device 100 may be attached to an exposed surface of a bearing frame.

Attachment piece 130 may include a threaded metal bolt, a magnet, an adhesive surface, or another mechanism for rigidly attaching enclosure 120 to rotating machinery 20. Attachment piece 130 may be integral with enclosure 120, such that securing attachment piece 130 to mounting surface 21 rigidly connects sensor device 100 to rotating machinery 20. In one implementation, attachment piece 130 may include a bolt configured to correspond to (e.g., engage using a thread) tapped mounting hole 22 in rotating machinery 20. For example, bolt 130 may be inserted into tapped mounting hole 22 by twisting the entire sensor device 100 (e.g., by hand tightening or using an optional torque wrench). When attachment piece 130 is attached to mounting surface 21 (e.g., being screwed into tapped mounting hole 22 or otherwise attached), vibrations from rotating machinery 20 may be transmitted to electronics assembly 110.

Figure 2:
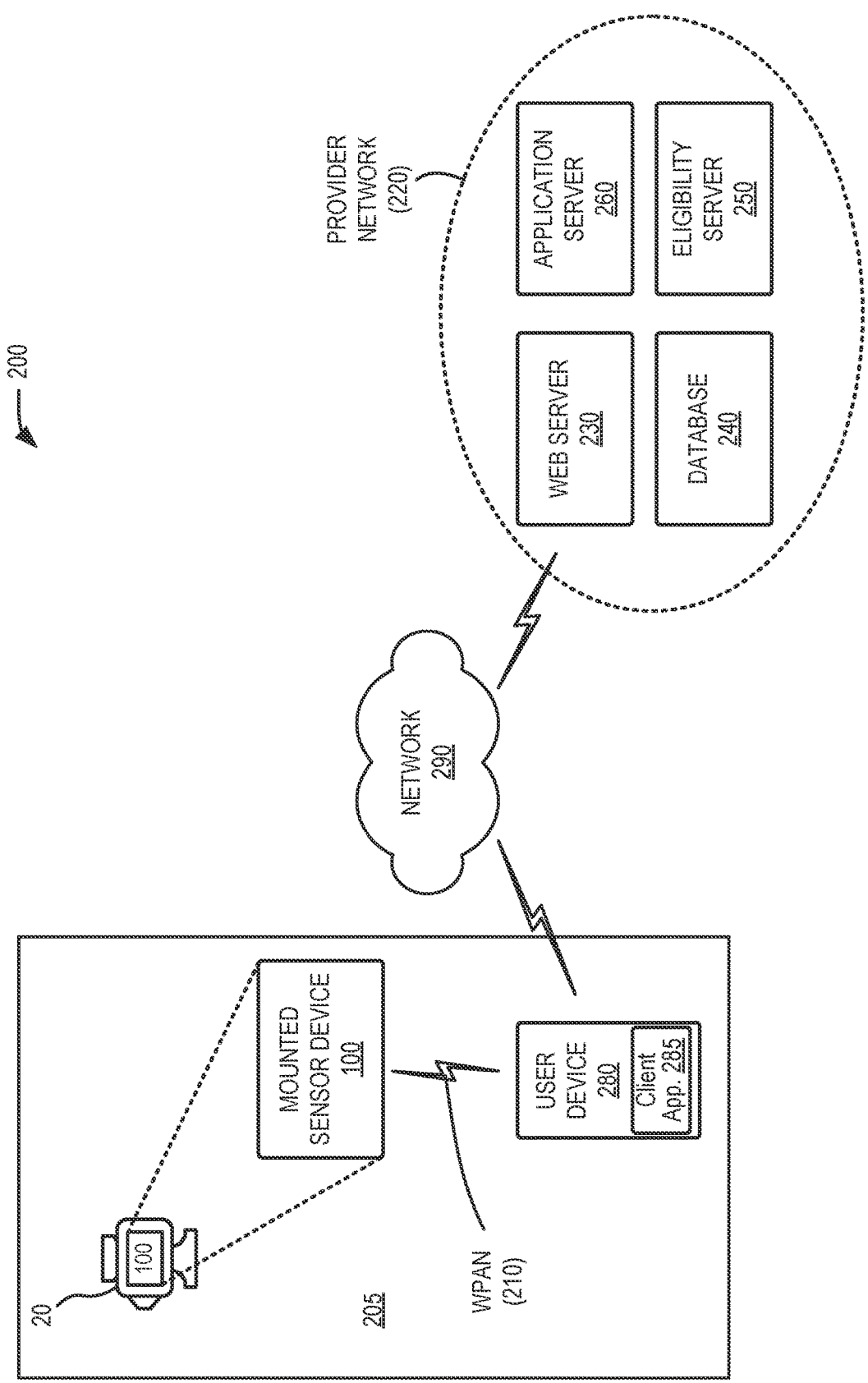
FIG. 2 is a diagram of a network environment in which systems and methods described here may be implemented.

FIG. 2 is a diagram illustrating an exemplary environment 200 in which systems and/or methods described herein may be implemented. As illustrated, environment 200 may include rotating machinery 20 onto which one or more sensor devices 100 are mounted. According to an implementation, multiple rotating machinery 20 with mounted sensor devices 100 may be distributed throughout a customer premises 205 (e.g., in an agricultural or industrial setting). Environment 200 may also include a provider network 220 with a web server 230, a database 240, an eligibility server 250, and an application server 260, a user device 280, and a network 290. Components of environment 200 may be connected via wired and/or wireless links.

Rotating machinery 20 may include a pump, such as a centrifugal pump or another type of pump, which may be monitored using vibration sensors. Sensor device 100 may be attached to rotating machinery 20; collect vibration, temperature, and other data; and provide collected data to user device 280. According to an implementation, sensor device 100 may communicate with user device 280 via WPAN 210. WPAN 210 may use, for example, IEEE 802.15 standards (e.g., BLE) or variations thereof to conduct sort range wireless communications.

Provider network 220 may include network devices, computing devices, and other equipment to provide services, including services for customers with sensor devices 100. For example, devices in provider network 220 may supply backend services to user devices 280 for remotely monitoring rotating machinery 20. Provider network 220 may include, for example, one or more private Internet Protocol (IP) networks that use a private IP address space. Provider network 120 may include a local area network (LAN), an intranet, a private wide area network (WAN), etc. According to an implementation, provider network 220 may use vendor-specific protocols to support Internet-of-Things (IoT) management. In another implementation, provider network 220 may include a hosting platform that provides an IoT data service. The IoT data service may include receiving packets that are transmitted by a client application 285 (e.g., running on user device 280) and implementing models to collect, store, analyze, and/or present event data from sensor devices 100, such a vibration RMS values. The hosting platform may also provide data-driven applications and/or analytics services for user devices 280, which owners of sensor devices 100 may use. Examples of hosting platforms include Amazon® Web Services (AWS), Microsoft Azure®, IBM Watson®, Verizon® ThingSpace®, etc. Although shown as a single element in FIG. 2, provider network 220 may include a number of separate networks.

Web server 230 may include one or more network or computational devices to manage service requests from eligible user devices 280. In one implementation, web server 230 may provide an application (e.g., an event data management application) to enable user device 280 to receive and respond to information related to rotating machinery 20. In another implementation, as described further herein, web server 230 may provide multiple types of browser-based user interfaces to facilitate individual pump monitoring, system monitoring, receive alerts, receive notifications, etc. Web server 230 may receive settings from user devices 280, may process/collate the received settings, and may forward the settings to application server 260 for implementation.

Database 240 may include one or more databases or other data structures to store data uploads (e.g., RMS vibration measurements) from sensor devices 100 via user device 280. Database 240 may also store reporting/monitoring configuration settings, device registrations (e.g., provided by user devices 280 via web server 230), user registrations, and/or associations of unique sensor identifiers and rotating machinery. In one implementation, database 240 may also store data retrieved from and/or used by eligibility server 250.

Eligibility server 250 may include one or more network or computational devices to provide backend support for authorizing user devices 280 to use provider network 220. For example, eligibility server 250 may store identification information for registered users and/or user devices 280. The information may be used to verify that a particular user/user device 280 has access to services and/or information provided by provider network 220. Upon verifying eligibility of a user/user device 280, eligibility server 250 may, for example, provide access to other devices in provider network 220.

Application server 260 may include one or more network or computational devices to perform services accessed through web server 230. For example, application server 260 may manage downloading applications provided to user devices 280 and/or may process incoming data (e.g., RMS vibration measurements forwarded from sensor devices 100) for storage in database 240. According to an implementation, application server 260 may use a series of APIs to exchange data with client application 285.

User device 280 includes a device that has computational and wireless communication capabilities. User device 280 may be implemented as a mobile device, a portable device, a stationary device, a device operated by a user, or a device not operated by a user. For example, user device 280 may be implemented as a smartphone, a computer, a tablet, a wearable device, or some other type of wireless device. In one implementation, user device 280 may include a communication interface with a cellular modem (e.g., a Long Term Evolution (LTE) or Fifth Generation network (5G) modem) and a local wired/wireless interface (e.g., a Bluetooth® (BT)/BT Embedded System (BTE) or BT Low Energy (BLE) interface, a near-field communication (NFC) wireless interface, and/or a Wi-Fi interface.

According to various exemplary embodiments, user device 280 may be configured to execute various types of software (e.g., applications, programs, etc.). As described further herein, user device 280 may download and/or register a client application 285. As described further herein, the client application 285 (or "app") may be configured to automatically detect sensor devices 100 when within relatively close proximity (e.g., a range of up to 100 feet).

Client application 285 may initiate a local wireless connection between user device 280 and sensor device 100. In one implementation, client application 285 may include instructions to initiate the local wireless connection in response to user input to user device 280, such as user input to obtain a vibration measurement from sensor device 100. Client application 285 may provide a measurement request to sensor device 100 (e.g., via WPAN 210) and extract from sensor device 100 a snapshot of current vibration data (e.g., an RMS value) for the corresponding rotating machinery 20. Client application 285 may cause user device 280 to present the current vibration data to a user. Using network 290, client application 285 may also forward the vibration data to provider network 220 for storage and/or analysis.

Network 290 may include one or more wired, wireless and/or optical networks that are capable of receiving and transmitting data, voice and/or video signals. For example, network 290 may include one or more access networks, IP multimedia subsystem (IMS) networks, core networks, or other networks. The access network may include one or more wireless networks and may include a number of transmission towers for receiving wireless signals and forwarding wireless signals toward the intended destinations. The access network may include a wireless communications network that connects subscribers (e.g., sensor devices 100, user devices 280, etc.) to other portions of network 290 (e.g., the core network). In one example, the access network may include an LTE network. In other implementations, the access network may employ another type of cellular broadband network such as 3rd Generation Partnership Project (3GPP) 5G network, or another type of advanced network. Network 290 may further include one or more satellite networks, one or more packet switched networks, such as an IP-based network, a local area network (LAN), a wide area network (WAN), a wireless local area network (WLAN), an intranet, the Internet, or another type of network that is capable of transmitting data.

In FIG. 2, when in operation, a user with user device 280/application 285 may request a vibration measurement of rotating machinery 20 in customer premises 205. A user may bring user device 280 in proximity of sensor device 100 to initiate a request, via WPAN 210, of a current RMS vibration reading for corresponding rotating machinery 20. According to an implementation, sensor device 100 may calculate an RMS results (e.g., a velocity RMS value) and provide the RMS result to user device 280 via WPAN 210. In another implementation, sensor 100 may also include a unique identifier (e.g., an alpha-numeric string) that associates sensor device 100 with rotating machinery 20. For example, a manufacture may cross-reference a unique identifier of sensor device 100 with a unique identifier of particular rotating machinery 20 during a manufacturing or refurbishing process. The association of the sensor device ID and the rotating machinery ID may be stored, for example, in database 240.

In FIG. 2, the particular arrangement and number of components of environment 200 are illustrated for simplicity. In practice there may be more sensor devices 100, provider networks 220, user devices 280, and/or networks 290. For example, there may be hundreds or thousands of sensor devices 100.

Figure 3A:
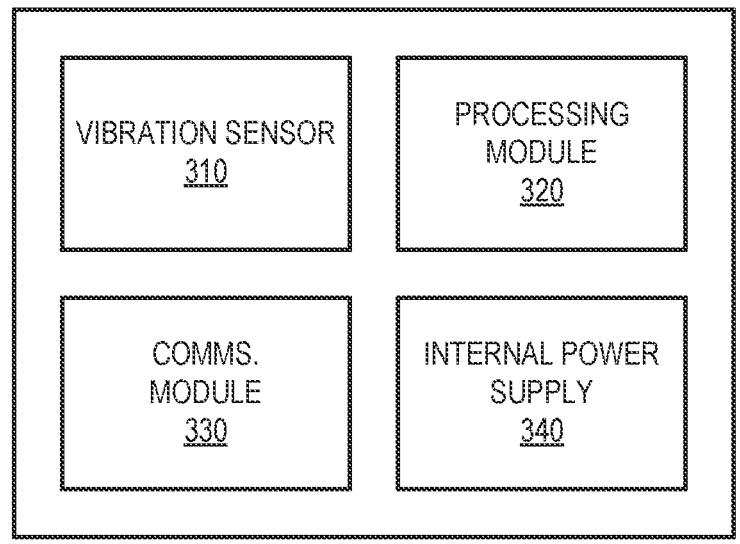
FIG. 3A is a block diagram of internal components of the electronics assembly of FIG. 1.

FIG. 3A is a block diagram of internal components of sensor device 100, which may be included, for example, in electronics assembly 110. As shown in FIG. 3A, electronics assembly 110 may include a vibration sensor 310, a processing module 320, a communication module 330, and an internal power supply 340. According to different implementations, one or more components of FIG. 3A may be installed on a printed circuit board, an etched wiring board, or a printed circuit assembly. In another implementation, electronics assembly 110 may include other logical components to calculate and communicate vibration data.

Vibration sensor 310 may include accelerometers, vibrometers, hardware integrators, signal amplifiers, and/or filters to detect and indicate sensed vibration in different directions. For example, vibration sensor 310 may include a low cost Micro-Electromechanical System (MEMS) accelerometer can be used when in contact with the rotating machinery under test to generate raw sensor data. In one implementation, vibration sensors 310 may include a set of three accelerometers to measure vibration along three respective axes (e.g., x-, y-, and z-axes of FIG. 1). In another implementation, vibration sensors 310 may measure vibration along two axes. According to one embodiment, the accelerometer may output a digital or analog time domain signal and provide its output to processing module 320 in a suitable unit.

Processing module 320 may include a combination of hardware and software to perform calculations to determine vibration velocity RMS values based on collected acceleration data. For example, processing module 320 may include a general-purpose processor with stored instructions to receive acceleration data from vibration sensors 310 and calculate vibration RMS values as described further herein. Processing module 320 may perform calculations in a manner that minimizes processor cycles and power requirements to provide RMS measurements.

Figure 3B:
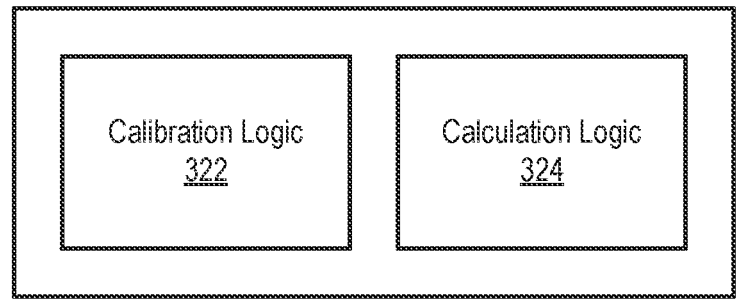
FIG. 3B is a block diagram illustrating logical components of the processor of FIG. 3B.

According to one implementation, processing module 320 may include logical components illustrated in FIG. 3B. As shown in FIG. 3B, processing module 320 may include calibration logic 322 and calculation logic 324.

Calibration logic 322 may configure the vibration sensor in response to a measurement request. That is, according to an implementation, calibration logic may perform a configuration procedure prior to performing each RMS measurement calculation. Calibration logic 322 may collect a short sample of vibration data (for each axis) from vibration sensor 310. Based on the sample vibration data (e.g., time domain (TD) acceleration data), calibration logic 322 may determine a scale range for vibration sensor 310. Using the scale range, calibration logic 322 may set a resolution for vibration sensor 310 to use for the requested RMS measurement. Thus, calibration logic 322 may optimize available resolution of vibration sensor 310 for each RMS measurement.

Calculation logic 324 may receive raw vibration data samples (e.g., TD acceleration data) for each of the multiple axes supported by vibration sensor 310. Calculation logic 324 may calculate a component velocity root mean square (vRMS) value, from the data samples, for each of the multiple axes. Calculation logic 324 may combine the component vRMS values into a sample vRMS value, and may provide a final vRMS value, based on the sample vRMS value, to the user device via communication module 330. An example of the calculation sequence is described further in connection with FIGS. 4 and 5 below.

Returning to FIG. 3A, in other implementations, processing module 320 may include one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs), microcontrollers, and/or some other type of component that interprets and/or executes instructions and/or data. Processing module 320 may be implemented as hardware (e.g., a microprocessor, etc.), a combination of hardware and software (e.g., a SoC, an ASIC, etc.) and may include one or multiple memories.

Processing module 320 may also control the overall operation or a portion of operation(s) performed by sensor device 100. Processing module 320 may store instructions to collect readings from vibration sensor 310 (e.g., how many samples to collect, the duration of the samples, etc.). Processing module 320 may cause data from vibration sensor 310 to be collected, calculate RMS values, and send final values to a user device (e.g., user device 280) when a wireless connection is detected and/or when requested by an application on the user device. According to an implementation, processing module 320 may include a clock (e.g., a real-time counter) to generate a time stamp for snapshot data (e.g., RMS data calculated based on readings from vibration sensor 310). According to another implementation, processing module 320 may store a unique identifier that may be used to associate sensor device 100 with rotating machinery 20. According to further implementation, processing module 320 may also be programmed to detect if calculated RMS values exceed a predetermined threshold value and generate an alert signal when a threshold is exceeded.

Communications module 330 permits sensor device 100 to communicate with other devices, such as a user device. According to implementations described herein, communication module 330 includes a WPAN interface, such as a BLE interface or NFC interface. For example, communication module 330 may include a transmitter and a receiver, or transceivers. Communication module 330 may include one or more antennas. Communication module 330 may operate according to a communication standard, such as a Bluetooth® standard, or non-standard short range wireless communications. According to one implementation, communications module 330 and processing module 320 may be included in an integrated SoC configuration.

Communication module 330 may enable sensor device 100 to transfer data, such as calculated vibration RMS values from processing module 320, to a user device 280 when user device 280 is within a relatively short distance of sensor device 100 (e.g., up to about 100 feet). Communication module 330 may include various processing logic or circuitry (e.g., multiplexing/de-multiplexing, filtering, amplifying, converting, error correction, etc.). According to one implementation, communication module 330 may detect a pairing signal from user device 280 and, in response, pair with user device 280 and provide a current vRMS value based on data from vibration sensor 210. According to another implementation, communication module 330 may be activated periodically to report a current reading obtained from vibration sensor 210 data.

Internal power supply 340 may include one or more batteries (e.g., a disposable battery) to power other components of sensor device 100. According to an implementation, internal power supply 340 may provide, for example, a five-year battery life for a predicted duty cycle. In one implementation, internal power supply 340 may include, for example, a lithium thionyl chloride battery for configured for low-power service.

Although FIGS. 3A and 3B show exemplary components of sensor device 100, in other implementations, sensor device 100 may contain fewer, different, differently-arranged, or additional components than depicted in FIGS. 3A and 3B. Additionally, or alternatively, a component of sensor device 100 may perform one or more other tasks described as being performed by another component of sensor device 100.

Figure 4:
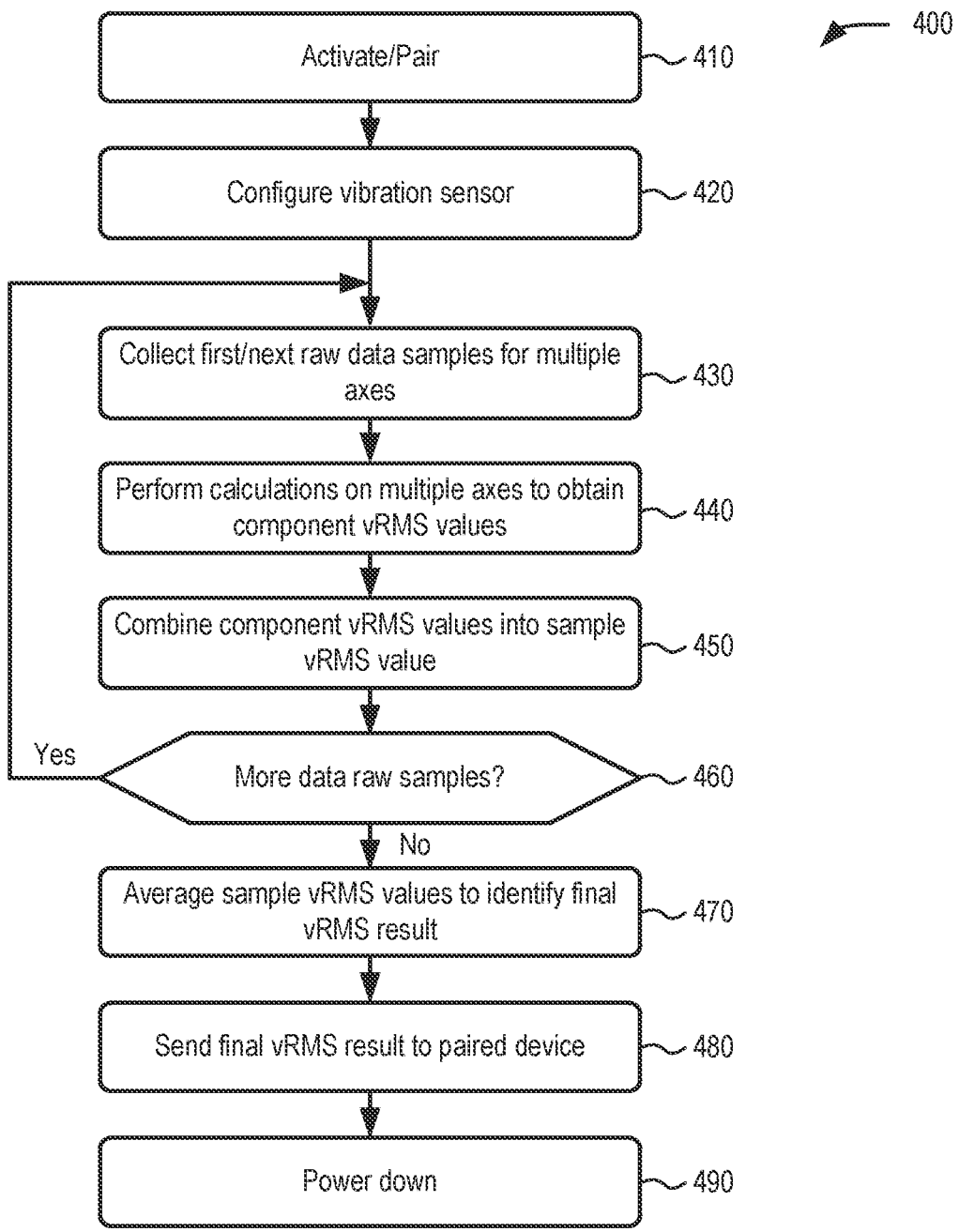
FIGS. 4 and 5 are flow diagrams illustrating a process for providing a vibration root mean square (RMS) measurement, according to an implementation described herein.

FIG. 4 is a flow diagram illustrating a process for providing a vibration vRMS measurement according to an implementation. According to an implementation, process 400 may be performed, for example, by sensor device 100. In other implementations, process 400 may be performed by sensor device 100 in conjunction other devices, such as user device 280 and/or other sensing devices.

Process 400 may include sensor device activating and pairing with a user device (block 410). For example, sensor device 100 may maintain a default sleep or deep sleep state with low-power advertising. When in a wireless signal range of sensor device 100, user device 280 may detect that sensor device 100 is available for providing vibration readings. Using client application 285, a user may request a vRMS reading from sensor device 100, which may cause user device 280 to send a wake-up/request signal to sensor device 100 and initiate a vibration RMS measurement.

Process 400 may further include configuring a vibration sensor (block 420), and collecting first raw data samples for multiple axes (block 430). For example, upon receiving a request from user device 280, sensor device 100 (e.g., processing module 320) may collect a short sample of vibration data from vibration sensor 310 to set a full scale range. Configuration of a scale range for vibration sensor 310 may be performed upon each measurement request from user device 280. In one implementation, a maximum and minimum from the short data sample is used to determine a working range and corresponding resolution for vibration sensor 310. Thus, processing module 320 may calibrate vibration sensor 100 with a high resolution for small vibration amplitudes or calibrate a lower resolution for large vibration amplitudes. The calibrated vibration sensor 310 may then provide a set of raw data samples to processing module 320. According to one implementation, the raw data samples may include component measurements for multiple axes (e.g., x-, y-, and z-axis).

Process 400 may also include performing calculations on the multiple axes to obtain component vRMS values (block 440), and combining the component vRMS values into a sample vRMS value (block 450), and determining if more raw data samples are required (block 460). For example, processing module 320 may obtain the raw data samples from vibration sensor 310 and calculate component vRMS values for each axis, representing a vibration measurement along each of the multiple axes (e.g., x-, y-, and z-axis) of vibration sensor 310. These calculations are described further below in connection with FIG. 5. The component values from each axis maybe combined using vector addition, for example, to obtain a single vRMS value for the data sample. Processing module 320 may be configured to utilize a set number of samples (e.g., 3 samples, 5 samples, 7 samples, etc.) in determining a final vRMS measurement result.

If more raw data samples are required (block 460—Yes), process 400 may return to process block 430 to collect a next set of raw data samples. For example, after a first data sample, vibration sensor 310 may produce a second and additional samples that may be converted to component vRMS values and then additional sample vRMS values.

If more raw data samples are not required (block 460—No), process 400 may additionally include averaging the sample vRMS values (block 470). For example, once processing module 320 has obtained a required number (e.g., 3, 5, etc.) of sample vRMS values, processing module 320 may calculate an average of the sample vRMS values to identify a final vRMS result.

Process 400 may further include sending the final vRMS result to the paired user device (block 480), and powering down (block 490). For example, using WPAN 210, sensor device 100 (e.g., communication module 330) may transmit the final vRMS result to user device 280, where the final vRMS result can be displayed via client application 285. Once the final vRMS result is transferred to user device 280, sensor device 100 may power down to a sleep mode (e.g., BLE deep sleep).

Figure 5:
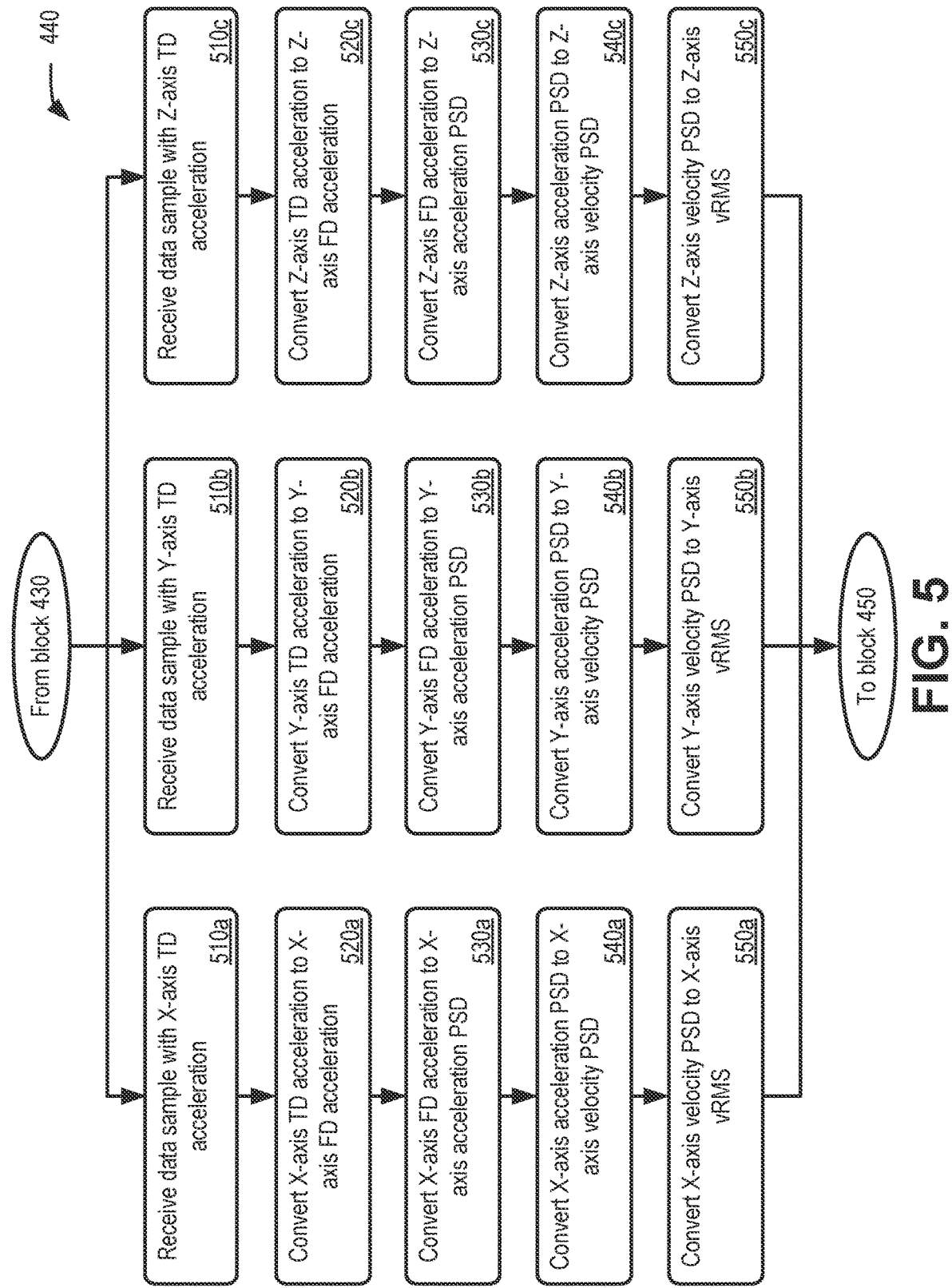

According to an implementation, process block 440 may include the process described in connection with FIG. 5. Referring to FIG. 5, process block 440 may involve performing a separate set of calculations for data samples from each axis of vibration sensor 310. Although calculations for x-, y-, and z-axis data are shown in parallel in FIG. 5, in other implementations, the calculations may be performed in series. Descriptions of process block 440 are described below in relation to x-axis calculations (process blocks 510a-550a). Similar descriptions apply to corresponding y-axis calculations (process blocks 510b-550b) and z-axis calculations (process blocks 510c-550c).

Process block 440 may include receiving a data sample with x-axis time domain (TD) acceleration value (block 510a) and converting the x-axis TD acceleration to an x-axis frequency domain (FD) acceleration value (block 520a). For example, processing module 320 may receive data samples from vibration sensor 310 and identify an x-axis TD data sample. Processing module 320 may use a fast Fourier transform (FFT) to convert from a TD acceleration value to an FD acceleration value.

Process block 440 may further include converting the x-axis FD acceleration value to an x-axis acceleration power spectrum density (PSD) value (block 530a), and converting the x-axis PSD acceleration value to an x-axis velocity PSD value (block 540a). For example, processing module 320 may determine the acceleration PSD by squaring the results of the FFT (e.g., the FD acceleration value) and normalizing the value to the frequency bin width (e.g., the scale ranged determined in block 420). Processing module 320 may then perform an integration to convert the acceleration PSD value to a velocity PSD value.

Process block 440 may additionally include converting the x-axis velocity PSD value to an x-axis vRMS value (block 550a). For example, processing module 320 may perform an integration to convert the velocity PSD value to a vRMS value for the x-axis.

Similar calculations may be performed in process block 440 to convert y-axis TD acceleration data to a y-axis vRMS value (process blocks 510b-550b) and to convert z-axis TD acceleration data to a y-axis vRMS value (process blocks 510c-550c).

Figure 6:
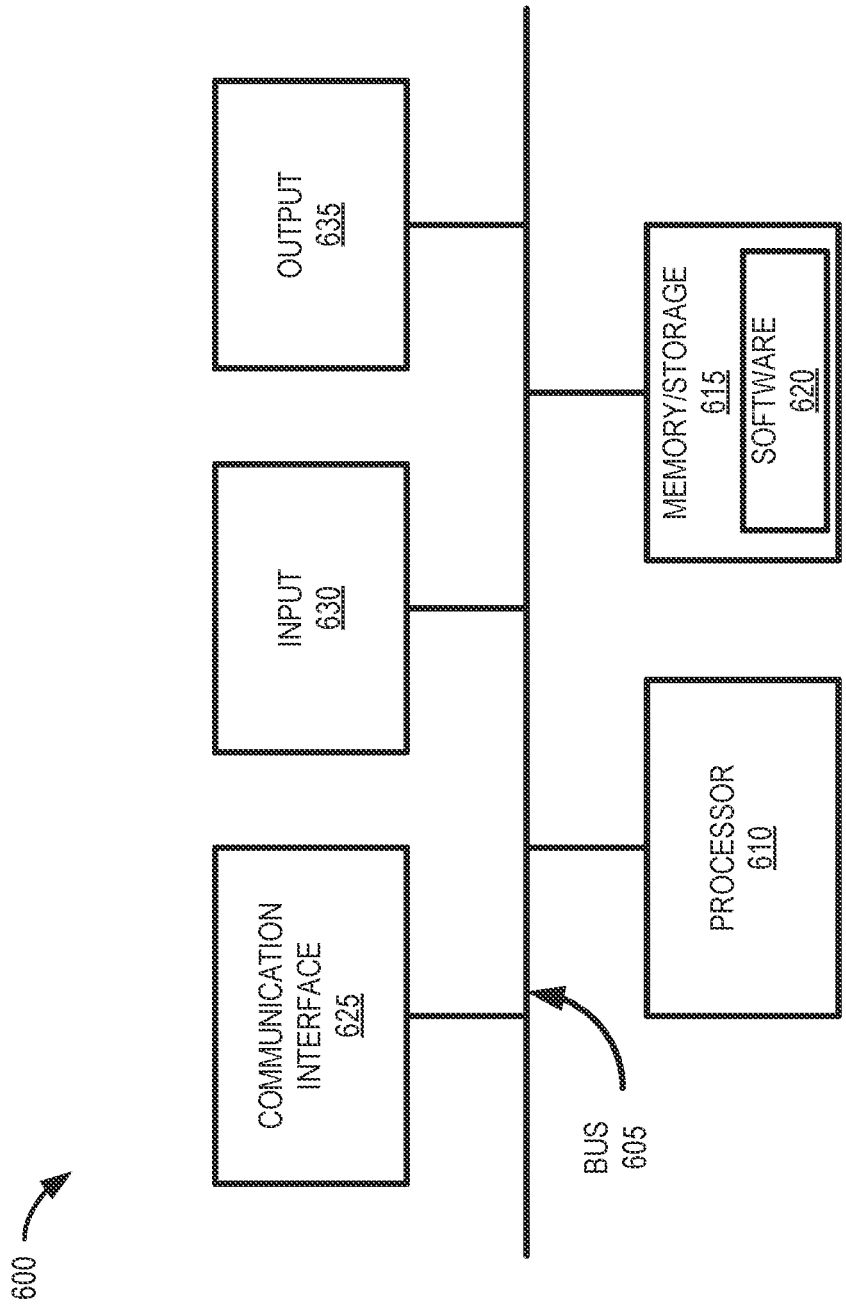
FIG. 6 is a diagram of exemplary components of a device that may be included in the environment of FIG. 2.

FIG. 6 is a diagram illustrating exemplary components of a device 600 that may be included in one or more of the devices described herein. For example, device 600 may correspond to web server 230, database 240, eligibility server 250, application server 260, user device 280, and other types of devices, as described herein. As illustrated in FIG. 6, device 600 includes a bus 605, a processor 610, a memory/storage 615 that stores software 620, a communication interface 625, an input 630, and an output 635. According to other embodiments, device 600 may include fewer components, additional components, different components, and/or a different arrangement of components than those illustrated in FIG. 6 and described herein.

Bus 605 includes a path that permits communication among the components of device 600. For example, bus 605 may include a system bus, an address bus, a data bus, and/or a control bus. Bus 605 may also include bus drivers, bus arbiters, bus interfaces, clocks, and so forth.

Processor 610 includes one or multiple processors, microprocessors, data processors, co-processors, graphics processing units (GPUs), ASICs, controllers, programmable logic devices, chipsets, FPGAs, application specific instruction-set processors (ASIPs), SoCs, CPUs (e.g., one or multiple cores), microcontrollers, neural processing unit (NPUs), and/or some other type of component that interprets and/or executes instructions and/or data. Processor 610 may be implemented as hardware (e.g., a microprocessor, etc.), a combination of hardware and software (e.g., a SoC, an ASIC, etc.), may include one or multiple memories (e.g., cache, etc.), etc.

Processor 610 may control the overall operation or a portion of operation(s) performed by device 600. Processor 610 may perform one or multiple operations based on an operating system and/or various applications or computer programs (e.g., software 620). Processor 610 may access instructions from memory/storage 615, from other components of device 600, and/or from a source external to device 600 (e.g., a network, another device, etc.). Processor 610 may perform an operation and/or a process based on various techniques including, for example, multithreading, parallel processing, pipelining, interleaving, etc.

Memory/storage 615 includes one or multiple memories and/or one or multiple other types of storage mediums. For example, memory/storage 615 may include one or multiple types of memories, such as, a random access memory (RAM), a dynamic random access memory (DRAM), a static random access memory (SRAM), a cache, a read only memory (ROM), a programmable read only memory (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 615 may include a hard disk (e.g., a magnetic disk, an optical disk, a magneto-optic disk, a solid state disk, etc.), a MEMS-based storage medium, and/or a nanotechnology-based storage medium. In some instances, memory/storage 615 may include drives for reading from and writing to the storage medium.

Memory/storage 615 may be external to and/or removable from device 600, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 615 may store data, software, and/or instructions related to the operation of device 600.

Software 620 includes an application or a program that provides a function and/or a process. Software 620 may include firmware, middleware, microcode, hardware description language (HDL), and/or other form of instruction. Software 620 may also be virtualized. Software 620 may further include an operating system (OS) (e.g., Windows, Linux, Android, proprietary, etc.).

Communication interface 625 permits device 600 to communicate with other devices, networks, systems, and/or the like. Communication interface 625 includes one or multiple wired and/or wireless interfaces. For example, communication interface 625 may include one or multiple transmitters and receivers, or transceivers. Communication interface 625 may operate according to a protocol stack and a communication standard. In some aspects, communication interface 625 may include an antenna. Communication interface 625 may include various processing logic or circuitry (e.g., multiplexing/de-multiplexing, filtering, amplifying, converting, error correction, application programming interface (API), etc.). Communication interface 625 may be implemented as a point-to-point interface, a service based interface, etc.

Input 630 permits an input into device 600. For example, input 630 may include a keyboard, a mouse, a display, a touchscreen, a touchless screen, a button, a switch, an input port, speech recognition logic, and/or some other type of visual, auditory, tactile, etc., input component. Output 635 permits an output from device 600. For example, output 635 may include a speaker, a display, a touchscreen, a touchless screen, a light, an output port, and/or some other type of visual, auditory, tactile, etc., output component.

Device 600 may perform a process and/or a function, as described herein, in response to processor 610 executing software 620 stored by memory/storage 615. By way of example, instructions may be read into memory/storage 615 from another memory/storage 615 (not shown) or read from another device (not shown) via communication interface 625. The instructions stored by memory/storage 615 cause processor 610 to perform a process and/or a function, as described herein. Alternatively, for example, according to other implementations, device 600 performs a process and/or a function as described herein based on the execution of hardware (processor 610, etc.).

A device, system, and methods are provided for remotely obtaining vibration RMS measurements for rotating machinery. A sensor device is mechanically mounted to rotating machinery. The sensor device includes an enclosure for an electronics assembly. The electronics assembly includes a vibration sensor, a processor, a wireless communications interface for exchanging data with a user device, and an internal battery. The processor is configured to receive a measurement request from the user device via the wireless communications interface. In response, the processor is further configured to configure the vibration sensor, receive data samples for multiple axes from the vibration sensor, and calculate a component root mean square (RMS) value, from the data samples, for each of the multiple axes. The processor may combine the component RMS values into a sample RMS value, and send a final RMS value, based on the sample RMS value, to the user device via the wireless communication interface.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, act, or instruction used in the description of the present application should be construed as critical or essential to the invention unless explicitly described as such.

What is claimed is:

1. A sensor device for rotating machinery, the sensor device comprising:
    an enclosure forming a sealed cavity;
    an attachment piece to rigidly secure the enclosure to the rotating machinery; and
    an electronics assembly secured within the sealed cavity of the enclosure, the electronics assembly comprising:
        a vibration sensor,
        a wireless communications interface for exchanging data with a user device, and
        a general-purpose processor configured to:
            receive a measurement request from the user device,
            configure a working range for the vibration sensor based on a first data sample and in response to the measurement request, wherein configuring the working range includes calibrating the vibration sensor with a higher resolution for smaller vibration amplitudes or calibrating the vibration sensor with a lower resolution for larger vibration amplitudes,
            receive, from the vibration sensor, additional data samples for multiple axes,
            calculate a component velocity root mean square (vRMS) value, from the additional data samples, for each of the multiple axes, wherein the calculating minimizes processor cycles of the general-purpose processor, and wherein the calculating comprises:
                identifying a first axis sample from the additional data samples for the multiple axes, wherein the first axis sample includes an acceleration time domain (TD) value,
                converting the acceleration TD value to an acceleration power spectrum density (PSD) value,
                converting the acceleration PSD value to a velocity PSD value, and
                converting the velocity PSD value to one of the component vRMS values,
            combine the component vRMS values into a sample vRMS value, send a final vRMS value, based on the sample vRMS value, to the user device via the wireless communications interface, and
generate an alert signal when the final vRMS value exceeds a threshold; and
a disposable battery that powers the vibration sensor, the wireless communications interface, and the general-purpose processor.

2. The sensor device of claim 1, wherein, when configuring the working range for the vibration sensor, the general-purpose processor is further configured to:
collect the first data sample of vibration data from the vibration sensor, and
determine the working range for the vibration sensor based on a maximum value and a minimum value of the first data sample of the vibration data.

3. The sensor device of claim 1, wherein the general-purpose processor is further configured to:
automatically initiate a sleep state for the sensor device after the sending.

4. The sensor device of claim 1, wherein the general-purpose processor is further configured to:
generate multiple sample vRMS values, including the sample vRMS value, from different component vRMS values, and
average the multiple sample vRMS values into the final vRMS value.

5. The sensor device of claim 1, wherein the sensor device is configured to attach to the rotating machinery as a single piece.

6. The sensor device of claim 1, wherein the vibration sensor includes a Micro-Electromechanical System (MEMS) accelerometer.

7. The sensor device of claim 1, wherein, when converting the acceleration TD value to an acceleration PSD value, the general-purpose processor is further configured to:
convert the acceleration TD value to an acceleration frequency domain (FD) value,
square the acceleration FD value, and
normalize the squared acceleration FD value to a frequency bin width that corresponds to the working range.

8. The sensor device of claim 1, wherein the wireless communications interface includes an interface for a wireless personal area network (WPAN).

9. The sensor device of claim 1, wherein, when sending the final vRMS value, the general-purpose processor is further configured to:
transmit a unique identifier associated with the rotating machinery.

10. A method, comprising:
receiving, by a general-purpose processor in a sensor device, a measurement request,
wherein the measurement request is provided from a user device via a wireless communication interface, and
wherein the sensor device includes an enclosure forming a sealed cavity, an attachment piece to rigidly secure the enclosure to a machine, and an electronics assembly, within the sealed cavity, that includes the general-purpose processor, a vibration sensor, the wireless communication interface, and a disposable battery that powers the electronics assembly;
configuring, by the general-purpose processor and in response to the measurement request, a working range for the vibration sensor in the sensor device, based on a first data sample, wherein configuring the working range includes calibrating the vibration sensor with a higher resolution for smaller vibration amplitudes or calibrating the vibration sensor with a lower resolution for larger vibration amplitudes;
receiving, by the general-purpose processor and from the vibration sensor, additional data samples for multiple axes;
calculating, by the general-purpose processor, a component velocity root mean square (vRMS) value, from the additional data samples, for each of the multiple axes, wherein the calculating minimizes processor cycles of the general-purpose processor, and wherein the calculating comprises:
identifying a first axis sample from the additional data samples for the multiple axes, wherein the first axis sample includes an acceleration time domain (TD) value,
converting the acceleration TD value to an acceleration power spectrum density (PSD) value,
converting the acceleration PSD value to a velocity PSD value, and
converting the velocity PSD value to one of the component vRMS values,
combining, by the general-purpose processor, the component vRMS values into a sample vRMS value;
generating, by the general-purpose processor, an alert signal when the final vRMS value exceeds a threshold; and
sending, by the general-purpose processor, a final vRMS value, based on the sample vRMS value, to the user device via the wireless communication interface.

11. The method of claim 10, wherein combining the component vRMS values includes performing vector addition to combine an x-axis component value, a y-axis component value, and a z-axis component value of the component vRMS values.

12. The method of claim 10, wherein configuring the working range for the vibration sensor comprises:
collecting the first data sample of vibration data from the vibration sensor, and
determining the working range for the vibration sensor based on a maximum value and a minimum value of the first data sample of the vibration data.

13. The method of claim 10, further comprising:
automatically initiating, by the general-purpose processor, a sleep state for the sensor device after the sending.

14. The method of claim 10, further comprising:
generating multiple sample vRMS values, including the sample vRMS value, from different component vRMS values, and
averaging the multiple sample vRMS values into the final vRMS value.

15. The method of claim 10, wherein the vibration sensor includes a Micro-Electromechanical System (MEMS) accelerometer.

16. The method of claim 10, wherein converting the acceleration TD value to an acceleration PSD value includes:
converting the acceleration TD value to an acceleration frequency domain (FD) value,
squaring the acceleration FD value, and
normalizing the squared acceleration FD value to a frequency bin width that corresponds to the working range.

17. A system for monitoring rotating machinery, the system comprising:
a sensor device including:
an attachment piece to rigidly secure an enclosure to the rotating machinery,
a vibration sensor,
a first wireless communications interface for exchanging data with a user device, and
a first general-purpose processor configured to:
receive a measurement request from the user device,
configure a working range for the vibration sensor based on a first data sample and in response to the measurement request, wherein configuring the working range includes calibrating the vibration sensor with a higher resolution for smaller vibration amplitudes or calibrating the vibration sensor with a lower resolution for larger vibration amplitudes,
receive, from the vibration sensor, additional data samples for multiple axes,
calculate a component velocity root mean square (vRMS) value, from the additional data samples, for each of the multiple axes, wherein the calculating minimizes processor cycles of the general-purpose processor, and wherein the calculating comprises:
identifying a first axis sample from the additional data samples for the multiple axes, wherein the first axis sample includes an acceleration time domain (TD) value,
converting the acceleration TD value to an acceleration power spectrum density (PSD) value,
converting the acceleration PSD value to a velocity PSD value,
converting the velocity PSD value to one of the component vRMS values, and
generating an alert signal when the final vRMS value exceeds a threshold,
combine the component vRMS values into a sample vRMS value, and
send a final vRMS value, based on the sample vRMS value, to the user device via the wireless communications interface,
a disposable battery that powers the vibration sensor, the first wireless communications interface, and the first general-purpose processor, and
the enclosure, the enclosure forming a sealed cavity over the disposable battery, the first wireless communications interface, and the first general-purpose processor.

18. The system of claim 17, further comprising:
the user device including:
a second wireless communications interface for exchanging data with the sensor device;
a memory to store instructions; and
a second processor configured to execute the instructions to:
establish a communication session with the sensor device,
send a measurement request to the sensor device,
receive, from the sensor device, the final vRMS value, and
present, to a user, the final vRMS value.

19. The system of claim 18, further comprising:
a network device configured to:
receive, from the user device, the final vRMS value, and
store the final vRMS value associated with other data for the rotating machinery.

20. The system of claim 17, wherein the first general-purpose processor is further configured to:
generate multiple sample vRMS values, including the sample vRMS value, from different component vRMS values, and
average the multiple sample vRMS values into the final vRMS value.

* * * * *